US00RE39934E

(19) United States
(12) Reissued Patent
Smiley et al.

(10) Patent Number: US RE39,934 E
(45) Date of Reissued Patent: Dec. 4, 2007

(54) ADJUSTABLE OPTICAL ATTENUATOR

(75) Inventors: John O. Smiley, Ottawa (CA); Robert Laflamme, Nepean (CA)

(73) Assignee: JDS Uniphase, Inc., Nepean (CA)

(21) Appl. No.: 10/324,028

(22) Filed: Dec. 20, 2002

(Under 37 CFR 1.47)

Related U.S. Patent Documents

Reissue of:
(64) Patent No.: 6,167,185
Issued: Dec. 26, 2000
Appl. No.: 09/198,607
Filed: Nov. 24, 1998

(51) Int. Cl.
*G02B 6/00* (2006.01)

(52) U.S. Cl. ..... 385/140; 385/25; 385/36; 385/34

(58) Field of Classification Search ..... 385/140, 385/15, 25, 27, 38, 36, 33, 34
See application file for complete search history.

(56) References Cited

U.S. PATENT DOCUMENTS

| | | | | | |
|---|---|---|---|---|---|
| 3,843,267 | A | | 10/1974 | Vital et al. | 356/225 |
| 4,591,231 | A | * | 5/1986 | Kaiser et al. | 385/73 |
| 5,087,122 | A | * | 2/1992 | Ostrander et al. | 356/73.1 |
| 5,136,681 | A | * | 8/1992 | Takahashi | 385/140 |
| 5,325,459 | A | * | 6/1994 | Schmidt | 385/140 |
| 5,481,631 | A | * | 1/1996 | Cahill et al. | 385/18 |
| 5,652,818 | A | | 7/1997 | Byron | 385/37 |
| 5,900,983 | A | * | 5/1999 | Ford et al. | 359/627 |
| 6,088,151 | A | * | 7/2000 | Robinson | 359/322 |
| 6,167,185 | A | * | 12/2000 | Smiley et al. | 385/140 |
| 6,222,656 | B1 | * | 4/2001 | Eu | 398/9 |

FOREIGN PATENT DOCUMENTS

| | | | | |
|---|---|---|---|---|
| CA | 2202308 | | 10/1997 | |
| JP | 55-73002 | * | 6/1980 | 385/140 |
| JP | 4-317009 | * | 11/1992 | 385/140 |

OTHER PUBLICATIONS

Canadian PTO Office Action, Sep. 8, 2003.

* cited by examiner

*Primary Examiner*—Brian M. Healy
(74) *Attorney, Agent, or Firm*—Pequignot + Myers LLC

(57) ABSTRACT

An optical attenuator for attenuating a collimated beam of light propagating along an optical path while preserving the composition of polarization of the collimated beam of light is disclosed. The optical attenuator comprises a beam attenuator for attenuating a portion of the collimated beam of light when a portion of the beam attenuator is disposed within the optical path. The beam attenuator has a cross section along a plane perpendicular to the direction of propagation of the collimated beam of light of the portion of the attenuator in the shape of a wedge. The attenuation is varied using a controller for moving the beam attenuator in order to vary a size of the portion of the wedge within the optical path.

33 Claims, 5 Drawing Sheets

ADJUSTABLE OPTICAL ATTENUATOR

Matter enclosed in heavy brackets [ ] appears in the original patent but forms no part of this reissue specification; matter printed in italics indicates the additions made by reissue.

FIELD OF THE INVENTION

This invention relates to an optical attenuator for attenuating the intensity of a beam of light, and in particular to an optical attenuator that preserves the composition of polarization of a beam of light over a wide range of attenuation.

BACKGROUND OF THE INVENTION

Between a transmitter and a detector of a fiber optic system, attenuation of the signal strength occurs. The system is designed for a normal amount of signal loss between transmitter and detector. At the detector, the signal strength must be maintained within an appropriate range. The minimum strength is determined by the need for an adequate signal-to-noise ratio. The maximum strength is determined by the need to avoid an overload of the detector.

In U.S. Pat. No. 5,325,459 issued to S. Schmidt in June, 1994 an optical attenuator is disclosed comprising a disk formed from two separate portions, a wedge shaped disk made of a light absorbing material affixed to a wedge shaped transparent disk. For adjusting different attenuations, the disk is rotated around an axis by a motor. The attenuator needs a complex setup to compensate for refraction and resulting beam deviations. The compensations ensure that the beam of light is coupled into the optical fiber at any angular orientation of the attenuator disk. As such, the device is expensive and prone to reliability problems.

A well known alternative to the complex solution disclosed in U.S. Pat. No. 5,325,459 is the use of an opaque straight edge disposed within the optical path of a collimated beam of light. Unfortunately, using this device for attenuating a beam of light results in a change of the polarization composition of the beam of light. This is an undesirable effect when used in an optical fibre network. Since polarization components of light within the system are often not known it is a disadvantage to have polarization dependent attenuation.

It would be advantageous to provide an attenuator that maintains the polarization composition of a beam of light.

SUMMARY OF THE INVENTION

It is an object of the invention to provide an optical attenuator for attenuating the intensity of a beam of light that preserves the polarization composition of a beam of light over a wide range of attenuation.

It is further an object of the invention to provide an optical attenuator that is easily implemented in a fiber optic network.

According to the invention a method of attenuating a beam of light having a circular cross-section is provided. The method comprises the step of disposing a member within the beam of light, the intersection of the member and the beam of light defining a region having two substantially equal sides defining an angle other than 0 degrees and 180 degrees therebetween the two sides having a central line of symmetry coincident with a line of symmetry through the centre of the circle, the angle moving along the line of symmetry.

According to the invention an optical attenuator for attenuating a beam of light having a circular cross-section is provided. The optical attenuator comprises:

a member for attenuating a portion of the beam of light when a portion of the member is disposed within the beam of light, the member being disposed within the beam of light such that the intersection of the member and the beam of light defines a region having two substantially equal sides defining an angle other than 0 degrees and 180 degrees therebetween, the two sides having a central line of symmetry coincident with a line of symmetry through the centre of the circle, the angle moving along the line of symmetry; and, a controller for moving the member in order to vary a size of the portion of the member within the beam of light.

BRIEF DESCRIPTION OF THE DRAWINGS

Exemplary embodiments of the invention will now be described in conjunction with the drawings, in which.

DETAILED DESCRIPTION OF THE INVENTION

Figure 1:
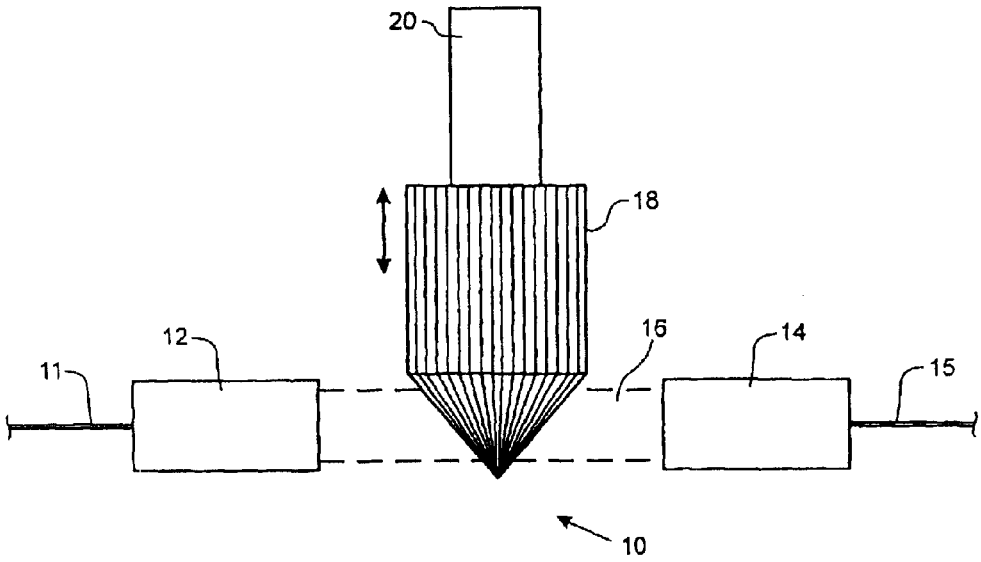
FIG. 1 is a schematic diagram of an attenuator according to the invention comprising a cone disposed within the optical path.
Figure 2:
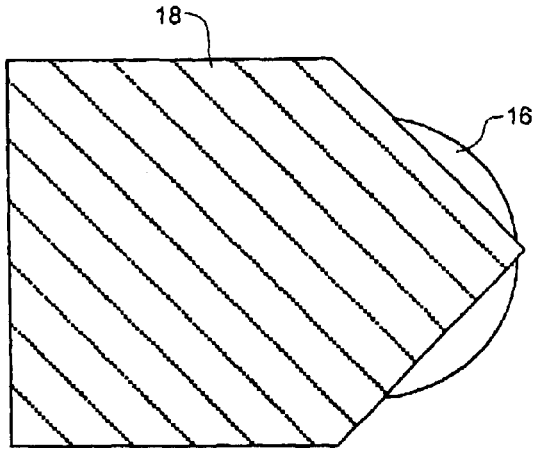
FIG. 2 is a schematic diagram of a projection of a cone covering a cross sectional portion of a collimated beam of light.

Referring to FIG. 1 an attenuator 10 according to the invention is shown. Light transmitted in an optical fiber 11 is collimated using an input lens 12. The collimated beam of light 16 passes through a gap between the input lens 12 and an output lens 14 where the collimated beam of light is focused and received by the output lens 14 and coupled into an optical fiber 15. Preferably the gap contains a substance such as air which does not substantially attenuate the beam of light. Preferably, the output lens 14 is a graded index (GRIN) lens. Fiber or rod lenses of this type are produced under the trade name "SELFOC"; the mark is registered in Japan and owned by the Nippon Sheet and Glass Co. Ltd. A beam attenuator in the form of a member 18 for attenuating a portion of the collimated beam of light 16 such as an opaque cone 18 is disposed within the optical path perpendicular to the longitudinal axis of the collimated beam of light 16. FIG. 2 shows a projection of the cone 18 covering a cross sectional portion of the collimated beam of light 16. Interrupting a portion of the collimated beam of light 16, the portion the size of the wedge, results in an attenuation of light intensity of the beam of light 16 received at the output lens 14. The attenuation is varied by varying the size of the portion of the cone 18 within the optical path. This is accomplished by moving the cone 18 in a direction substantially perpendicular to the principle axis of the beam of light using a controller 20.

Alternatively, the attenuator comprises an opaque cone within a transparent body. For example, such an attenuator is realised by immersing a cone made of laminated glass in a transparent fluid, the glass and the fluid having matching refractive indices. During a cooling process the fluid solidifies and retains the cone at a predetermined location within the solidified fluid.

Further alternatively, the attenuator comprises a transparent body having a conic indention, wherein the surface of the body defining the indention is covered with a layer of opaque or light absorbing material.

Preferably, the cone 18 comprises an angle of 90 degrees. In order to attenuate the light within the beam of light while maintaining the polarization composition the cone is moved into the beam of light such that the point of the cone moves along a diameter of a cross section of the beam of light and the side of the cone that is illuminated by the beam of light is substantially symmetrical about the diameter. In this way, approximately an equal amount of light of each orthogonal polarization is blocked or attenuated.

Figure 3:
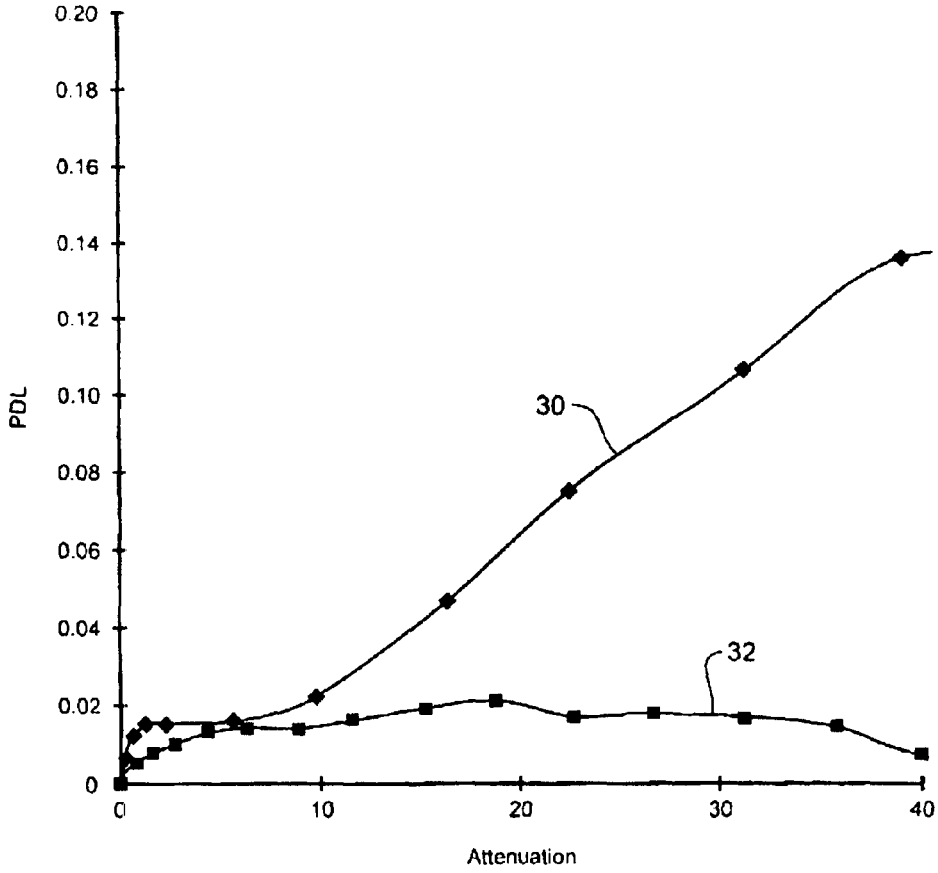
FIG. 3 is a diagram showing polarization dependent loss as function of attenuation for an attenuator according to the invention compared with a prior art device.

The attenuator according to the invention is advantageous compared with prior art devices such as a straight edge because the attenuated beam of light has substantially a same polarization composition as the collimated beam of light. FIG. 3 is a diagram showing the Polarization Dependent Loss (PDL) as a function of the attenuation for the attenuator according to the invention 32 in comparison with a prior art device 30 comprising a straight edge. As shown in FIG. 3 the PDL for an attenuator according to the invention is substantially constant and low level over a wide range of attenuation. In comparison the PDL for the straight edge is increasing with increasing attenuation for attenuations greater than 10 dB. A high value of PDL indicates a strong dependence of the attenuation on the polarization of the collimated light, for example a component with vertical polarization may be substantially attenuated while a horizontal component is not affected. This results in a change of the polarization composition of the collimated beam of light during the attenuation. A change of polarization due to attenuation is an undesirable effect.

In another embodiment according to the invention the beam of light 16 is attenuated using a wedge shaped edge. Preferably, the edge comprises at least an outer layer of light absorbing material in order to prevent light reflected from the edge from interfering with the incoming beam of light 16. Preferably the wedge is substantially flat, thereby allowing it to be moved into and out of a narrow gap.

Optionally, the attenuator comprises a wedge shaped body of light absorbing material.

Figure 4:
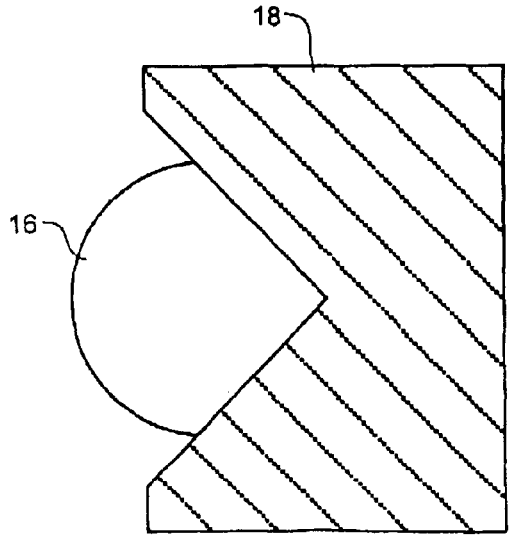
FIG. 4 is a schematic diagram of another embodiment of an attenuator according to the invention comprising an edge with a wedge shaped opening disposed within the optical path.

FIG. 4 shows a further embodiment of an attenuator according to the invention. A cross sectional portion of the collimated beam of light 16 is covered by an edge 18 having a wedge shaped opening moved along an axis of symmetry 19 through the center of the beam of light. As is evident, the two edges act to block light from the light beam so as to maintain the polarization composition thereof. The wedge shaped opening when moved into the beam of light 16 defines two substantially equal sides within the beam of light 16. The angle of the wedge is moved along a central line of the beam of light 16. Since the beam of light is substantially circular, the central line is a diameter of the circle. The two substantially equal sides within the beam of light 16 are substantially symmetrical about the same diameter.

Alternatively, the attenuator comprises a body of light absorbing material having a wedge shaped opening.

Figure 5:
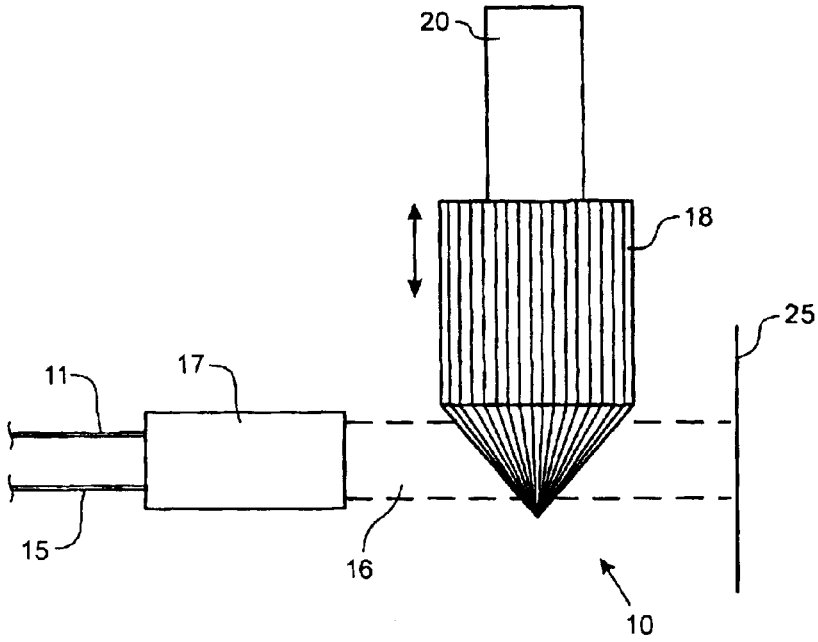
FIG. 5 is a schematic diagram of another embodiment of an attenuator according to the invention comprising a cone disposed within the optical path.
Figure 6:
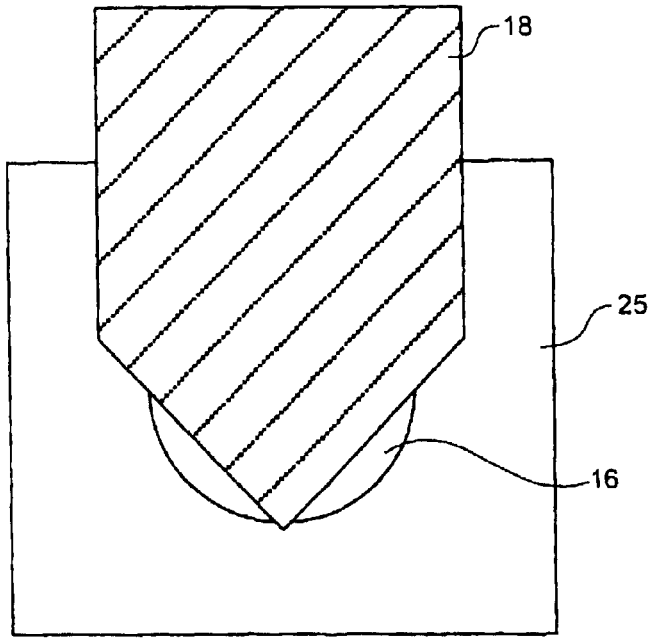
FIG. 6 is a schematic diagram of a projection of a cone covering a cross sectional portion of a reflected beam of light; and, FIG. 7 is a schematic diagram of another embodiment of an attenuator according to the invention comprising a cone disposed within the optical path, the cone being affixed to an axle for rotation.

Referring to FIG. 5, another embodiment of an attenuator 10 according to the invention is shown. An optical fiber 11 is connected to an input/output lens 17. Light transmitted in the optical fiber 11 is collimated using an input/output lens 17. The collimated beam of light 16 passes through an air gap between the input/output lens 17 and a reflective surface 25, such as a mirror, where the collimated beam of light is reflected to the input/output lens 17 and coupled into an optical fiber 15. An opaque cone 18 is disposed within the optical path perpendicular to the longitudinal axis of the collimated beam of light 16 between the input/output lens 17 and the mirror 25. Moving the cone is achieved, for example, using a screw mechanism. By disposing a cone at one end of a shaft and threading an opposing end of the shaft, turning of a mating thread allows the cone to be moved into and out of the beam of light 16 with precision. FIG. 6 shows a projection of the cone 18 covering a cross sectional portion of the collimated beam of light 16 reflected from the reflective surface 25.

In another embodiment according to the invention the beam of light 16 is reflected by the reflective surface 25 onto an output lens 14, different from the input lens 12.

Figure 7:
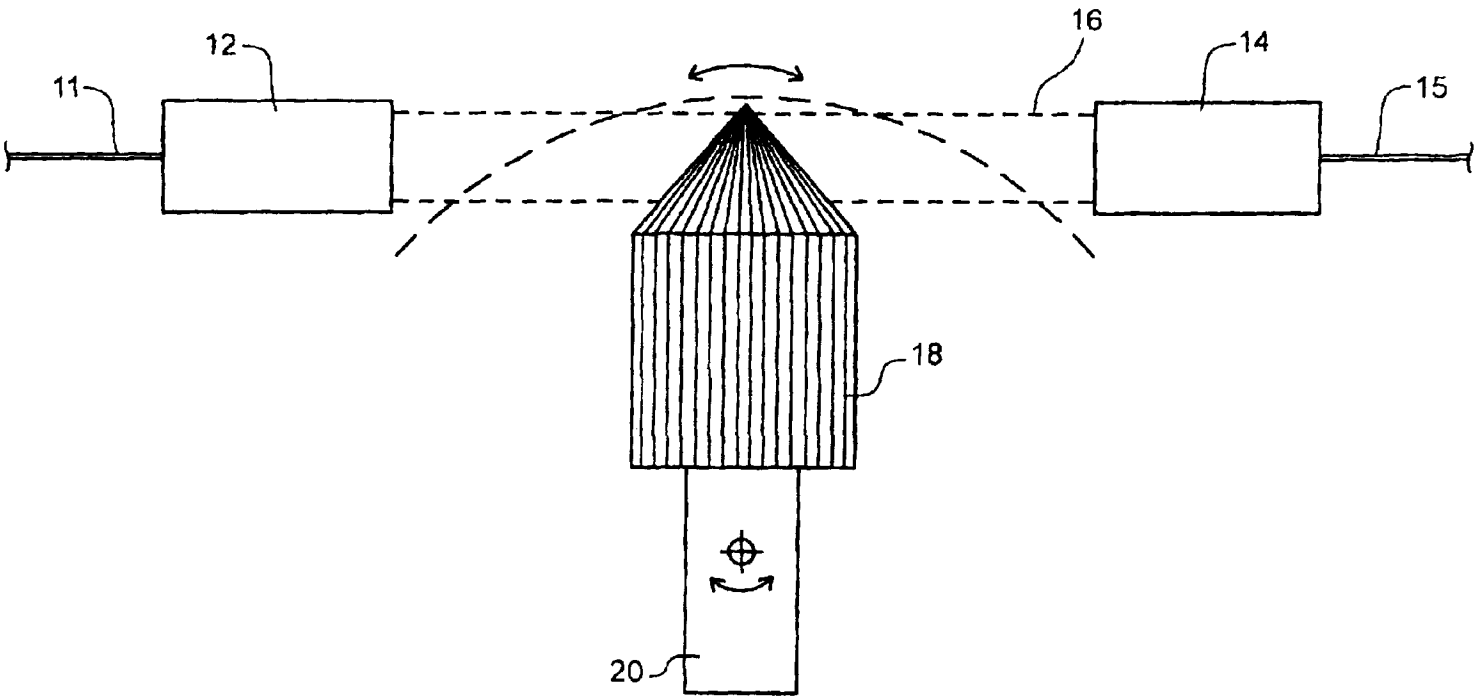

Optionally, the cone 18 is moved in another fashion such that the tip of the cone is within the optical path of the collimated beam of light 16 and the portion of the beam of light 16 blocked by the cone is altered. Referring to FIG. 7, a cone 18 is shown affixed to an axle 40. The cone 18 is moved into and out of the path of a beam of light by rotating the axle 40. This allows for a simpler mechanism than that necessary for transverse motion. Conversely, it requires more space as the lenses 12 and 14 are spaced sufficiently to allow the cone 18 to rotate into and out of the optical path.

Figure 8:
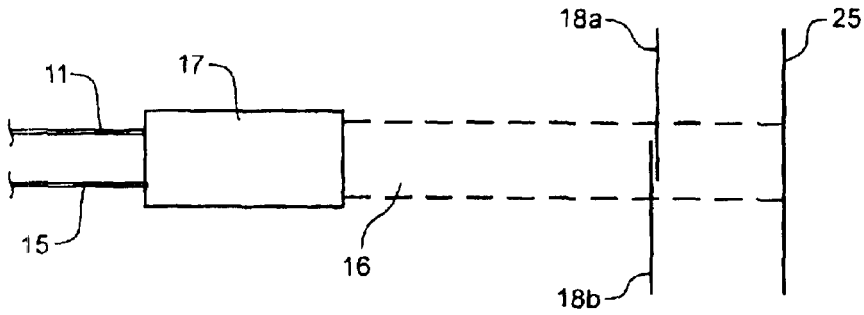
FIG. 8 is a schematic diagram of another embodiment according to the invention wherein the beam attenuator is formed of two sheets of opaque material; and, FIG. 8a is a schematic diagram of a projection of the two sheets shown in FIG. 8 covering a cross sectional portion of a collimated beam of light.
Figure 8A:
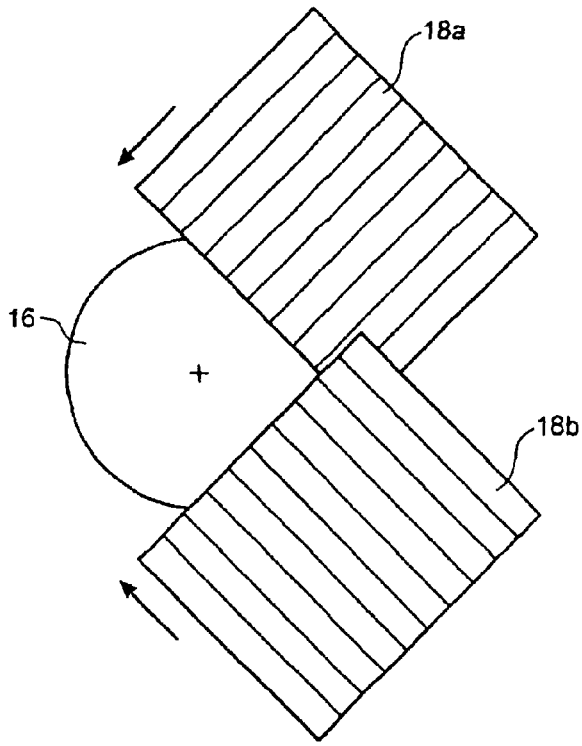

Referring to FIGS. 8 and 8a, another embodiment of an attenuator according to the invention is shown. An optical fiber 11 is connected to an input/output lens 17. Light transmitted in the optical fiber 11 is collimated using an input/output lens 17. The collimated beam of light 16 passes through an air gap between the input/output lens 17 and a reflective surface 25, such as a mirror, where the collimated beam of light is reflected to the input/output lens 17 and coupled into an optical fiber 15. A beam attenuator in the form of two slanted sheets 18a and 18b of opaque material is disposed within the optical path. An angle is defined between the two sheets. Preferably, the angle is 90 degrees. The two sheets are moved toward each other such that each sheet is equidistant from a centre of the circular cross section of the beam of light 16. The resulting amount of the beam of light 16 that is blocked is a same amount as that blocked by the member having a wedge shaped opening and described above.

A beam attenuator according to the invention is defined herein and in the claims that follow to comprise an object or a portion of an object, the object or the portion of an object for attenuating light. For example, when a rectangular glass plate is provided with an opaque arrow head thereon, the beam attenuator refers to the opaque arrowhead.

Of course, numerous other embodiments may be envisaged without departing from the spirit and scope of the claimed invention.

What is claimed is:

1. A method of attenuating a beam of light having a circular cross-section comprising the step of disposing a member having a substantially opaque beam attenuating portion within the beam of light, the intersection of the beam attenuating portion of the member and the beam of light defining a beam region that is smaller than the beam of the light and having two substantially equal sides defining an angle therebetween of other than 0 degrees and 180 degrees, the two sides having a central line of symmetry coincident with a line of symmetry through the centre of the circle, the angle moving along the line of symmetry.

2. A method of attenuating a beam of light having a circular cross-section as defined in claim 1, wherein a portion of the outer circumference of the beam intersects the member, the portion being less than 360 degrees.

3. An optical attenuator for attenuating a beam of light having a circular cross-section, the optical attenuator comprising:

a beam attenuator which is at least partially light blocking for attenuating a portion of the beam of light when a portion of the beam attenuator is disposed within the beam of light, the beam attenuator being disposed within the beam of light such that the intersection of the beam attenuator and the beam of light defining a beam region that is smaller than the beam of the light and having two substantially equal sides having an angle other than 0 degrees and 180 degrees therebetween, the two sides having a central line of symmetry coincident with a line of symmetry through the centre of the circle, the angle moving along the line of symmetry; and, a controller for moving the beam attenuator in order to vary a size of the portion of the beam attenuator within the beam of light.

4. An optical attenuator for attenuating a beam of light having a circular cross-section as defined in claim 3, wherein the beam attenuator comprises a cylindrical shaft having a cone at a first end thereof.

5. An optical attenuator for attenuating a beam of light having a circular cross-section as defined in claim 4, wherein the beam attenuator includes a thread at a second end thereof and the controller mates with the threading for causing the beam attenuator to advance or retract in a substantially linear direction.

6. An optical attenuator for attenuating a beam of light having a circular cross-section as defined in claim 3, wherein the beam attenuator comprises a portion of a member, the portion for substantially attenuating light.

7. An optical attenuator for attenuating a beam of light having a circular cross-section as defined in claim 6, wherein the beam attenuator comprises an opaque cone disposed within a transparent substrate.

8. An optical attenuator for attenuating a beam of light having a circular cross-section as defined in claim 3, wherein the two substantially equal sides define an angle of 90 degrees.

9. An optical attenuator for attenuating a beam of light having a circular cross-section as defined in claim 3, wherein the beam attenuator for attenuating a portion of the beam of light comprises a wedge shaped edge.

10. An optical attenuator for attenuating a beam of light having a circular cross-section as defined in claim 3, wherein the beam attenuator for attenuating a portion of the beam of light comprises a wedge shaped body of light absorbing material.

11. An optical attenuator for attenuating a beam of light having a circular cross-section as defined in claim 3, wherein the beam attenuator for attenuating a portion of the beam of light comprises an edge having a wedge shaped opening.

12. An optical attenuator for attenuating a beam of light having a circular cross-section as defined in claim 3, wherein the beam attenuator for attenuating a portion of the beam of light comprises a body of light absorbing material having a wedge shaped opening.

13. An optical attenuator for attenuating a beam of light having a circular cross-section as defined in claim 3, wherein the beam attenuator for attenuating a portion of the beam of light comprises two sheets of opaque material defining an angle therebetween, the two sheets being moved in opposing directions such that the angle moves along the line of symmetry.

14. An optical attenuator for attenuating a beam of light having a circular cross-section as defined in claim 3, wherein the beam attenuator for attenuating a portion of the beam of light further comprises a layer of light absorbing material.

15. An optical attenuator for attenuating a beam of light having a circular cross-section as defined in claim 3, further comprising an input lens.

16. An optical attenuator for attenuating a beam of light having a circular cross-section as defined in claim 3, further comprising an output lens.

17. An optical attenuator for attenuating a beam of light having a circular cross-section as defined in claim 16, wherein the output lens comprises a GRIN lens.

18. An optical attenuator for attenuating a beam of light having a circular cross-section as defined in claim 3, comprising a reflective surface for reflecting the beam of light incident thereon back along the optical path in an opposite direction.

19. An optical attenuator for attenuating a beam of light having a circular cross-section as defined in claim 18, wherein the reflective surface comprises a mirror.

20. An optical attenuator for attenuating a beam of light having a circular cross-section as defined in claim 3, comprising a detector.

*21. An optical attenuator for attenuating a beam of light comprising:*

*a body of light blocking material including at least one wedge-shaped projection at a leading edge thereof for attenuating the beam of light; and*

*a controller for varying the position of the body within the beam of light to control the attenuation thereof;*

*wherein the body comprises a cylindrical shaft having a cone at a first end thereof.*

*22. The optical attenuator according to claim 21, wherein the body includes a thread at a second end thereof; and wherein the controller mates with the thread causing the body to advance or retract in a substantially linear direction.*

*23. An optical attenuator for attenuating a beam of light comprising:*

*a body of light blocking material including at least one wedge-shaped projection at a leading edge thereof for attenuating the beam of light; and*

*a controller for varying the position of the body within the beam of light to control the attenuation thereof;*

*wherein each projection includes two substantially equal sides, which define an angle of 90° therebetween.*

*24. The optical attenuator according to claim 23, wherein the body is made of a material having a characteristic selected from the group consisting of opaque, light absorbing, and reflective.*

*25. An optical attenuator for attenuating a beam of light comprising:*

*a body of light blocking material including at least one wedge-shaped projection at a leading edge thereof for attenuating the beam of light; and*

*a controller for varying the position of the body within the beam of light to control the attenuation thereof;*

*wherein the body includes two wedge shaped projections with a wedge-shaped opening therebetween.*

*26. The optical attenuator according to claim 25, wherein the body is flat for movement into and out of a narrow gap.*

*27. The optical attenuator according to claim 25, wherein a central line of symmetry of the body is coincident with a line of symmetry of the beam of light.*

*28. The optical attenuator according to claim 25, wherein a central line of symmetry of the opening is coincident with a line of symmetry of the beam of light.*

*29. The optical attenuator according to claim 25, wherein the body comprises two sheets of opaque material defining the wedge-shaped opening therebetween, the two sheets being moveable in opposing directions.*

*30. The optical attenuator according to claim 25, further comprising an input port optically coupled to an input lens, and an output port optically coupled to an output lens.*

*31. The optical attenuator according to claim 30, further comprising: an input port optically coupled to a first lens; an output port optically coupled to the first lens; and a reflective surface for reflecting the light incident thereon in an opposite direction back through the first lens to the output port.*

*32. An optical attenuator for attenuating a beam of light comprising:*

*a body of light blocking material including at least one wedge-shaped opening at a leading edge thereof for attenuating the beam of light; and*

*a controller for varying the position of the body within the beam of light to control the attenuation thereof.*

*33. The optical attenuator according to claim 32, wherein a central line of symmetry of the opening is coincident with a line of symmetry of the beam of light.*

* * * * *